United States Patent
George et al.

(10) Patent No.: US 7,110,234 B2
(45) Date of Patent: Sep. 19, 2006

(54) POWER SUPPLY PROTECTION ARRANGEMENT

(75) Inventors: John Barrett George, Carmel, IN (US); Kevin Michael Williams, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/510,058

(22) PCT Filed: Apr. 3, 2003

(86) PCT No.: PCT/US03/10278

§ 371 (c)(1),
(2), (4) Date: Oct. 4, 2004

(87) PCT Pub. No.: WO03/085951

PCT Pub. Date: Oct. 16, 2003

(65) Prior Publication Data

US 2005/0174713 A1 Aug. 11, 2005

Related U.S. Application Data

(60) Provisional application No. 60/370,071, filed on Apr. 4, 2002.

(51) Int. Cl.
*H04N 3/18* (2006.01)

(52) U.S. Cl. ..................... 361/93.1; 348/730

(58) Field of Classification Search ............... 361/93.1; 315/364, 391; 348/730
See application file for complete search history.

(56) References Cited

U.S. PATENT DOCUMENTS

| | | | |
|---|---|---|---|
| 3,638,130 A * | 1/1972 | Freeborn | 330/260 |
| 3,818,128 A * | 6/1974 | Chambers et al. | 348/730 |
| 3,898,522 A | 8/1975 | Klein et al. | |
| 4,114,072 A | 9/1978 | Willis | |
| 4,788,591 A | 11/1988 | Decraemer | |
| 4,916,366 A | 4/1990 | Wilber et al. | |
| 4,961,032 A | 10/1990 | Rodriguez-Cavazos | |
| 6,373,671 B1 * | 4/2002 | Watanabe et al. | 361/93.8 |
| 6,667,461 B1 * | 12/2003 | Cogan | 219/209 |

OTHER PUBLICATIONS

Copy of Search Report Dated Jun. 1, 2003.

* cited by examiner

*Primary Examiner*—Brian Sircus
*Assistant Examiner*—Zeev Kitov
(74) *Attorney, Agent, or Firm*—Joseph J. Laks; Harvey D. Fried; Christine Johnson

(57) ABSTRACT

In a projection television receiver, a common switch mode power supply energizes the convergence circuits, and other load circuits of the projection television receiver. In normal operation, a switch couples a supply voltage produces in the common switch mode power supply to the convergence circuits. When, as a result of a fault, a supply current in the convergence circuits is excessive, the common switch mode power supply is decoupled from the convergence circuits and other load circuits remain energized and operative.

6 Claims, 3 Drawing Sheets

POWER SUPPLY PROTECTION ARRANGEMENT

CROSS REFERENCE TO RELATED APPLICATIONS

This application claims the benefit, under 35 U.S.C. § 365 of International Application PCT/US03/10278, filed Apr. 3, 2003, which was published in accordance with PCT Article 21(2) on Oct. 16, 2003 in English and which claims the benefit of provisional application Ser. No. 60/370,071, filed Apr. 4, 2002.

BACKGROUND OF THE INVENTION

The invention relates to a power supply protection arrangement of a video display apparatus, for example, a projection television (TV) receiver.

The displayed image in, for example, a direct view TV receiver or in a projection TV receiver having a cathode ray tube (CRT), may suffer from electron beam landing location errors such as geometrical and convergence errors. It is known to correct such errors for a CRT using a dynamic convergence arrangement. The amount of correction may vary dynamically in a given deflection cycle, in accordance with the location of the beam on the display screen.

In one prior art arrangement, to minimize manufacturing costs of a direct view TV receiver model and a projection TV receiver model, both models shared the same chassis. The main deflection circuits were common. Direct view models used about 90% of the chassis. For economic reasons the main chassis power supply was sized for the direct view model and a projection convergence power supply was added on for a projection TV receiver model.

When, as a result of a fault, a supply current exceeds a predetermined value, a threshold level of a protection detector is exceeded and causes the dedicated convergence switch mode power supply to shut down. Trouble shooting convenience requires that the TV receiver show a picture when the convergence circuits have a fault. Thus, the rest of the TV receiver circuits including the deflection circuits remain energized and operational. The convergence dedicated switch mode supply remains turned off until the projection TV receiver is turned off and then on, again, by a user.

In carrying out an inventive feature, a common switch mode power supply energizes the convergence circuits and the rest of the TV receiver circuits. Instead of using the prior art separate power supplies solution, a fast acting latching power supply voltage disconnect arrangement for the convergence circuits is utilized. Such arrangement provides a cost advantage.

FIG. 1 illustrates an example of a prior art power amplifier that drives the convergence winding in a CRT of the projection video display, shown in FIG. 3 of U.S. Pat. No. 4,961,032 in the name of Rodriguez-Cavazos, entitled, Dual Power Source Output Amplifier (the Rodriguez-Cavazos patent). The symbols and reference numerals in FIG. 1 are the same as in FIG. 3 of the Rodriguez-Cavazos patent except that a prime sign (') is appended to each.

In FIG. 1, an amplifier 50' comprises a differential amplifier 12', a buffer 14' and one output stage 16'. The differential amplifier 12' is formed by transistors Q1' and Q2'. An input waveform signal $V_{IN}'$ is connected to the base of transistor Q1'. The collector of transistor Q1' is connected to a high voltage supply source of positive polarity voltage $+V_H'$. The emitters of transistors Q1' and Q2' are connected together, and through a resistor R1', to a negative high supply voltage $-V_H'$. A parallel combination of sense resistors R21' and R22' are connected to a deflection coil 24' of a yoke Y1' and the base of transistor Q2', for developing the sense voltage $V_S$. A transistor Q11' converts the output current at the collector of transistor Q2' into an output voltage across a load resistor R18'. Diodes D8', D9', D10' and D11' establish a biasing voltage for the buffer stage 14', which includes transistors Q9' and Q10'. The emitters of transistors Q9' and Q10' of the buffer stage drive the bases of transistors Q4' and Q5', respectively, through resistors R13' and R14', respectively. Transistors Q4' and Q5' form class B output stage 16'. The emitters of transistors Q4' and Q5' are connected to resistors R7' and R8', respectively. The output voltage signal of the amplifier is generated at the junction of resistors R7' and R8', which is connected to the coil 24' of convergence yoke Y1'.

Output stage 16' provides high current. It needs to provide a high voltage drive, during horizontal retrace, and a low voltage drive, outside horizontal retrace. Output stage 16' compares dynamically varying input signal $V_{IN}'$ to sense voltage $V_S$ developed across current sense resistors R21' and R22' that are coupled in series with the convergence winding. Output stage 16' generates the necessary current to minimize any difference between the varying input signal $V_{IN}'$ and sense voltage $V_S'$.

If positive polarity voltage $+V_H'$ is turned off and, simultaneously, negative voltage supply $-V_H'$ is turned on, during a power-up or start-up interval, transistors Q10' and Q5' will turn on at the limit Consequently, a current $I_{Y1}'$ in convergence yoke Y1' having an excessive magnitude flows also in sense resistors R21' and R22' that could damage them. Even a short-term overstress may cause an unacceptable sense resistor value change. A sense resistor value change causes an uncompensated change in convergence correction gain that distorts the picture.

In a power supply embodying an inventive feature, a positive polarity voltage that is analogous to voltage $+V_H'$ is turned on prior to turning on of negative voltage supply that is analogous to voltage $-V_H'$, during the power-up or start-up interval. Furthermore, a power supply circuit breaking protection is employed that prevents excessive current in the sense resistors, as a result of a failure in the feedback loop.

SUMMARY OF THE INVENTION

A video display apparatus, embodying an inventive feature, including a main deflection circuit for generating a main deflection current in a main deflection winding to scan an electron beam on a screen of a cathode ray tube. A first amplifier stage generates an auxiliary deflection current in an auxiliary deflection winding to correct a raster distortion. A power supply output transistor generates a first power supply current of a load circuit and a second power supply current of the first amplifier stage. A sensor detects an occurrence a fault condition in a current path of the power supply current of first amplifier stage. A first power switch responsive to an output of the sensor for selectively reducing the second power supply current of the first amplifier stage, without interrupting the first power supply current of the load circuit, when the fault condition occurs.

BRIEF DESCRIPTION OF THE DRAWINGS

FIG. 2b illustrates a power supply having a protection arrangement, embodying an inventive feature, for the power amplifier of FIG. 2a.

DESCRIPTION OF THE PREFERRED EMBODIMENTS

Figure 2A:
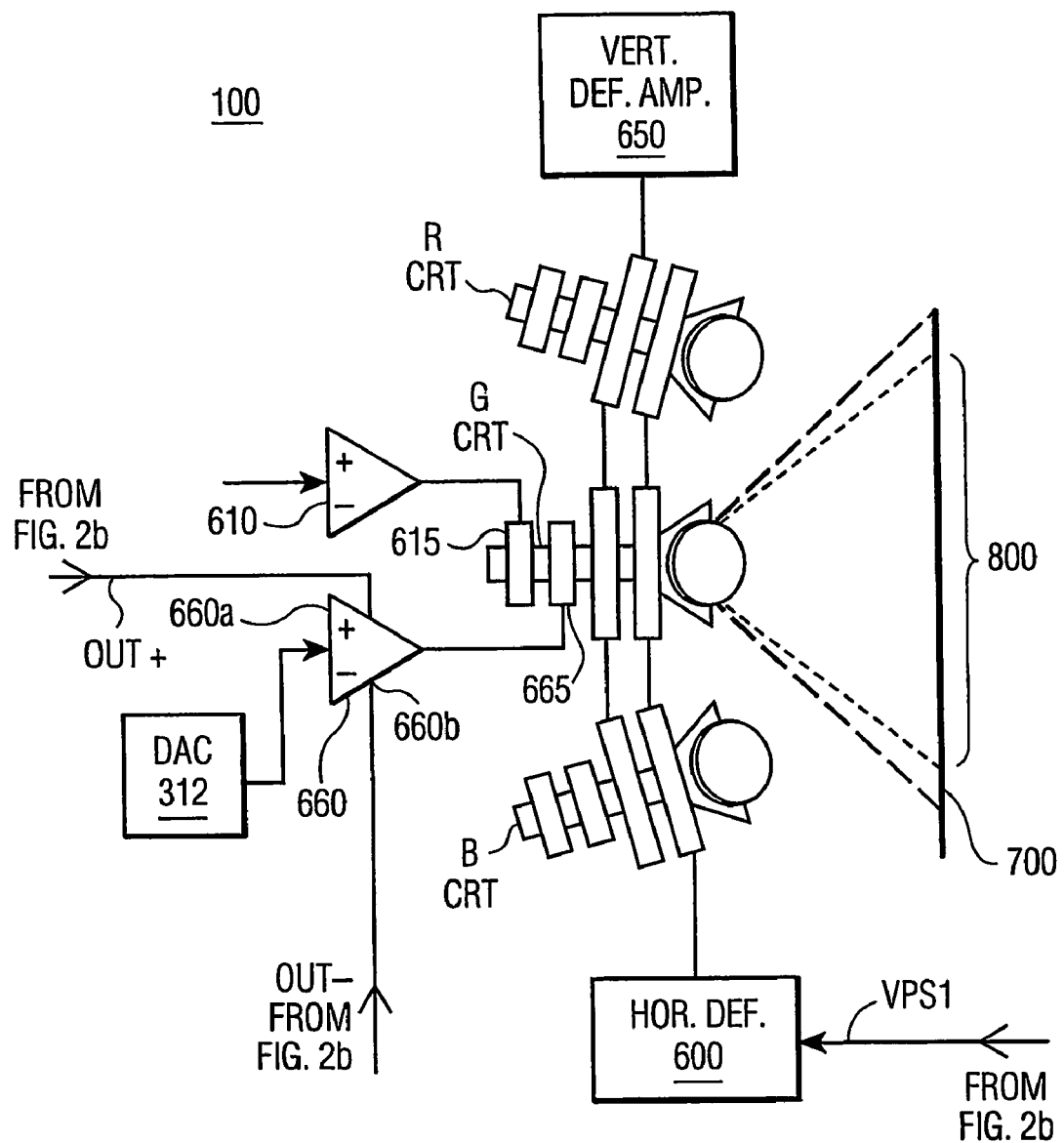
FIG. 2a illustrates a prior art deflection system of a projection television receiver.

FIG. 2a illustrates, in block diagram form, a conventional deflection system 100 of a projection television receiver. Deflection system 100 provides dynamic convergence. Three cathode ray tubes (CRT's), R, G and B produce electron beams that form a combined image 800 on a screen 700. The deflection field in each CRT is controlled in a similar way. For example, CRT G is equipped with a main horizontal deflection coil driven by a horizontal deflection output stage 600 and with a main vertical deflection coil driven by a vertical deflection amplifier 650, conventionally constructed. CRT G is also depicted with an auxiliary horizontal convergence coil 615 driven by a horizontal convergence amplifier 610 and with an auxiliary vertical convergence coil 665 driven by a vertical convergence amplifier stage or amplifier 660. Amplifier 660 is energized by a positive supply voltage OUT+ and by a negative supply voltage OUT−. Correction data stored in a memory, not shown, are applied via a digital-to-analog (D/A) converter 312 and power amplifier 660 to auxiliary vertical convergence coil 665.

Figure 1:
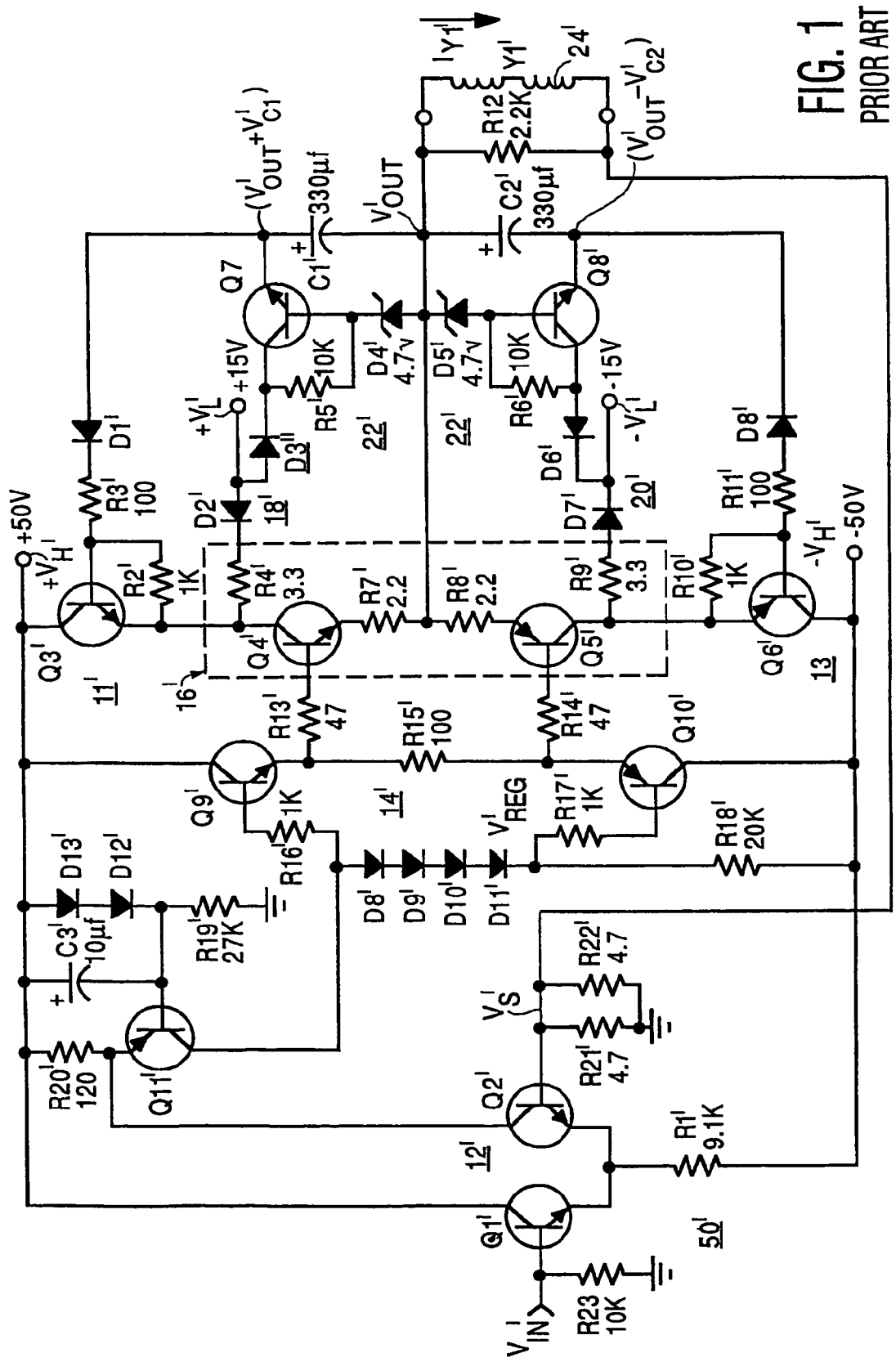
FIG. 1 illustrates a prior art power amplifier that drives a convergence winding of a projection video display.

Amplifier 660 may have a similar topology as the amplifier described in the Rodriguez-Cavazos patent, shown in FIG. 1. For example, voltage OUT+ of FIG. 2a will be applied to the amplifier of FIG. 1 instead of voltage +$V_H'$ and voltage OUT− of FIG. 2a will be applied to the amplifier of FIG. 1 instead of voltage −$V_H'$.

Figure 2B:
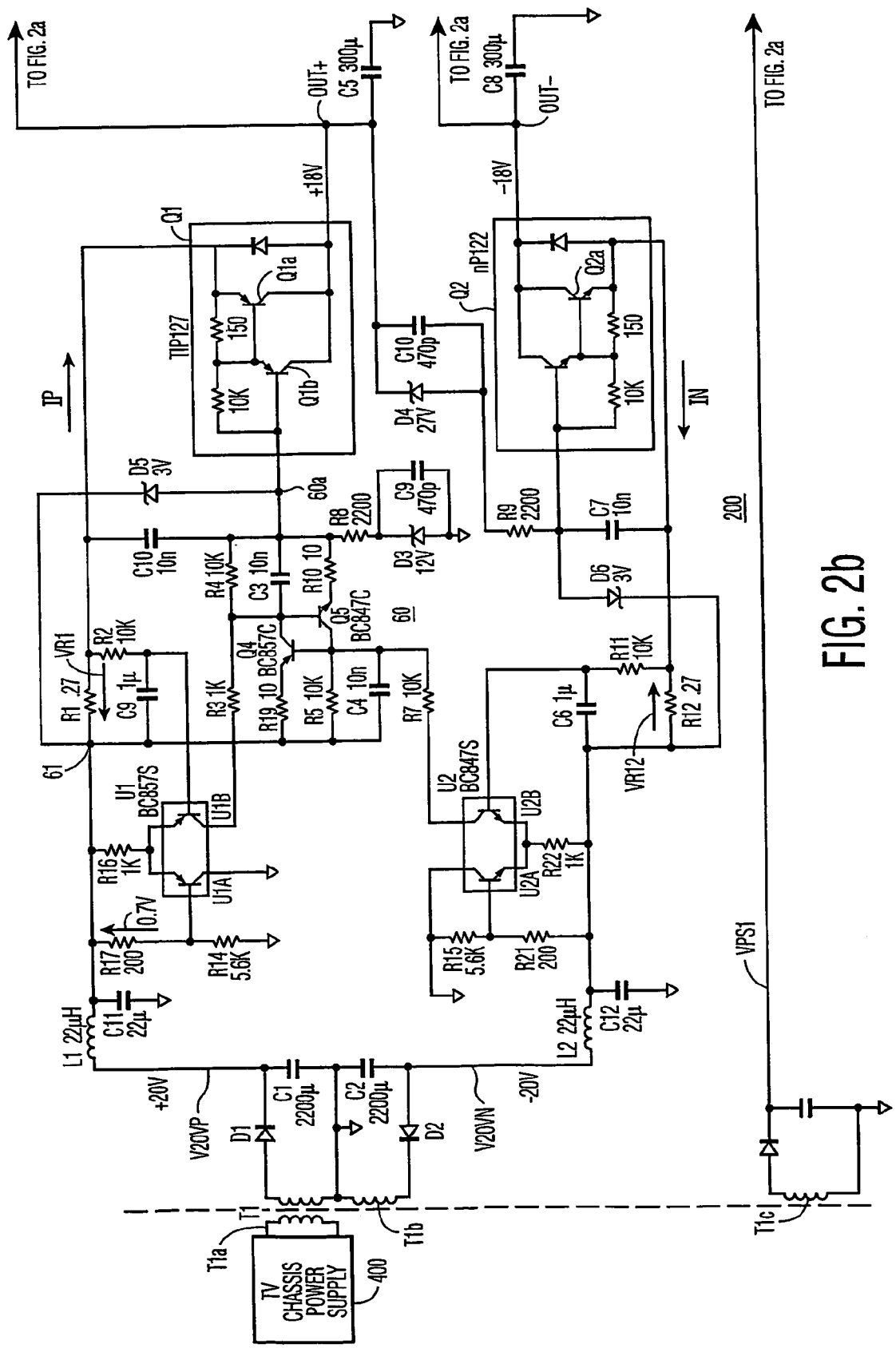

FIG. 2b illustrates, in details, a power supply protection arrangement 200, embodying an inventive feature. Similar symbols and numerals in FIGS. 2a and 2b indicate similar items or functions. A conventional switch mode power supply 400 of FIG. 2b is coupled to a primary winding T1a of a chopper transformer T1. A secondary winding T1b is coupled to a half wave rectifier D1 and a filter capacitor C1 for generating a regulated supply voltage V20VP of +20V, in a conventional manner. Winding T1b is also coupled to a half wave rectifier D2 and a filter capacitor C2 for generating a regulated supply voltage V20VN of −20V.

Voltage V20VP is applied via a pair of an inductor L1 and a capacitor C11 forming a low pass filter to an emitter of a power switch transistor Q1a via a current sensing resistor R1. Inductor L1 and capacitor C11 attenuate high frequency switching transients of switch mode power supply 400. Similarly, voltage V20VN is applied via a pair of an inductor L2 and a capacitor C12 forming a low pass filter to an emitter of a power switch transistor Q2a via a current sensing resistor R12. When conductive, transistor Q1a applies voltage V20VP to, for example, a filter capacitor C5 to develop an output voltage OUT+ of +18V at a positive supply input terminal 660a of convergence amplifier 660 of deflection system 100 of FIG. 2a Similarly, when transistor Q2a of FIG. 2b is conductive, voltage V20VN is applied to a filter capacitor C8 to develop an output voltage OUT− of −18V at a negative supply input terminal of FIG. 2a of convergence amplifier 660. On the other hand, when disabled, transistor Q1a of FIG. 2b decouples transformer T1 or voltage V20VP from terminal 660a of FIG. 2a Similarly, when disabled, transistor Q2a of FIG. 2b decouples transformer T1 or voltage V20VN from terminal 660b of FIG. 2a. Transistor Q1a of FIG. 2b is controlled via a transistor Q1b that are coupled in a Darlington configuration to form a switched Darlington transistor Q1. Similarly, transistor Q2a is controlled via a transistor Q2b that are coupled in a Darlington configuration to form a switched Darlington transistor Q2.

A pair of resistors R14 and R17 form a voltage divider for voltage V20VP. A pair of resistors R14 and R17 provide a discharge path to ground for capacitor C1, when switch mode power supply 400 is turned off. Resistors R17 and R14 provide a 0.7V reference voltage across resistor R17 that is developed at the base of a transistor U1A. The base of a transistor U1B is coupled to capacitor C9 to develop a base voltage in transistor U1B that is proportional to the average value of a supply or load current IP. A sense resistors R1 develops a voltage VR1 that is indicative of a magnitude of supply current IP.

Transistors U1A and U1B are packaged to assure electrical matching and temperature tracking to form a temperature compensated comparator. A collector current is produced in transistor U1B, when the base voltage of transistor U1B is smaller than a threshold voltage determined by a ratio of the values of resistors R21 and R15 and voltage V20VP.

Voltage VR1 is low pass filtered in a filter that includes a resistor R2 and capacitor C9 for developing the base voltage of transistor U1B. The time constant of resistor R2 and capacitor C9 is selected for preventing short term or transient overload such as an initial charging of output filter capacitor C5, during start-up, from falsely triggering the comparator formed by transistors U1A and U1B. Such false triggering of the comparator formed by transistors U1A and U1B could cause an undesired power supply shut down, during a short term or transient overload.

A similar arrangement is coupled to voltage V20VN and performs a similar function. Thus, a pair of NPN transistors U2A and U2B is analogous to the pair of PNP transistors U1A and U1B, respectively. A pair of resistors R15 and R21 is analogous to the pair of resistors R14 and R17, respectively. A resistor R12 is analogous to resistor R1. A resistor R11 and capacitor C6 are analogous to resistor R2 and capacitor C9, respectively.

A latch 60 that is controlled by the collector current in each of transistor U1B and U2B is formed by a pair of cross-coupled transistors Q4 and Q5. The base of transistor Q4 is coupled to the collector of transistor Q5 and the base of transistor Q5 is coupled to the collector of transistor Q4. An emitter of transistor Q5 is coupled via an emitter resistor to the base of transistor Q1b and to a series arrangement of a resistor R8 and a zener diode D3. A junction terminal 61 between inductor L1 and resistor R1 that develops a voltage level approximately equal to voltage V20P is coupled via an emitter resistor R19 to the emitter of transistor Q4 and via a collector resistor R5 to the collector of transistor Q5 and to the base of transistor Q4.

When the average value of each of current IP and current IN is normal or non-excessive, neither of voltage VR1 and VR12 is sufficient to turn on any of transistors U1B and U2B. Consequently, no collector current in produced in any of transistors U1B and U2B. Therefore, transistors Q4 and Q5 are turned off and remain in that state unless a fault condition occurs that causes any of current IP and current IN becomes excessive.

In the absence of a fault condition, no collector current is produced in either transistor U1B or U2B. Therefore, latch 60 is not triggered and transistors Q4 and Q5 are maintained turned off. The result is that the base current of transistor Q1 flows through resistor R8 and diode D3 causing base voltage 60a to be at a sufficiently low level to maintain transistor Q1a in saturation. As a consequence of transistor Q1a being in saturation, voltage OUT+ is developed at a normal operation level. At start up, transistor Q1 will turn on when the voltage V20VP rises to about 14 volts. Voltage 60a is also developed in a capacitor C10 that is coupled to the base of transistor Q1b. After transistor Q1 turns on, its collector voltage OUT+rises to near +18V.

In carrying out an inventive feature, voltage OUT+ is coupled via a zener diode D4 and a resistor R9 to the base of Darlington transistor Q2. Transistor Q2a will turn on and be in saturation when the difference between voltage OUT+ and voltage V20VN in capacitor C2, that reaches −20V, exceeds about 29V. At this voltage level, base bias current for transistor Q2 starts to flow in diode D4 and resistor R9. Consequently voltage OUT− is maintained at a normal operation level of −18V. By using voltage OUT+ to control the turn on of transistor Q2, a requirement, discussed before with respect to the power amplifier of the Rodriguez-Cavazos patent, that positive voltage OUT+ be developed before negative voltage OUT− is developed, is met.

When, as a result of fault, the average value of current IP in a current path that includes transistor Q1a or current IN in a current path that includes transistor Q2a is excessive, voltage VR1 or VR12 at a level that is sufficient to turn on transistor: U1B or U2B, respectively, appears across filter capacitor C9 or C6. Consequently, the collector current in transistor U1B or U2B, that is coupled via a resistor R3 or a resistor R7 to the base of transistor Q5 or Q4, respectively, will trigger latch 60. Resistor R19 and a resistor R10 limit a transient current that results from the rapid discharge of capacitor C10, during the transition of latch 60 to operation in a latching mode.

The latching mode in latch 60 is maintained by a current flowing from terminal 61 and produced by voltage V20VP through transistors Q4 and Q5, resistor R8 and diode D3. The action of transistor Q4 and Q5 is similar to that of a silicon controlled switch (SCS). Transistors Q4 and Q5 are used to achieve a low sustaining current and a low cost. A silicon controlled rectifier (SCR) cannot be conveniently used because the collector currents in transistors U1B and U2B that are required to trigger latch 60 are at opposite polarities. The saturation voltage across transistors Q4 and Q5 is about 0.7V.

The switching state of Darlington transistors Q1 and Q2 are controlled by an output voltage 60a of latch 60. Transistors Q4 and Q5, when latch 60 operates in the latching mode, shunt the base emitter of Darlington transistor Q1. Therefore, a collector current in transistor Q5 increases the base voltage of transistor Q1b in a manner to turn off transistor Q1a. Thus, transformer T1 is decoupled from amplifier 660 of FIG. 2a. Consequently, voltage OUT+is disabled.

A secondary winding T1c of transformer T1 of FIG. 2b is coupled to a diode 19 for generating a supply voltage VPS1 that energizes stages of the television receiver, for example, output stage 600 of FIG. 2a. When voltage OUT+ of FIG. 2b and voltage OUT− are disabled, as a result of a fault, as explained before, output stage 600 of FIG. 2a remains, advantageously, operational. This facilitates service operation. Thus, transformer T1 forms a common power stage for both output stage 600 and amplifier 660 of FIG. 2a.

During a transient overload condition such as, during start-up, when filter capacitors C5 and C6 of FIG. 2b are charged, current IP in transistor Q1 or current IN is limited by a zener diode D5 and a zener diode D6, respectively, so that the maximum current ratings of Darlington transistors Q1 and Q2 are not exceeded. Zener diode D5, for example, is coupled between terminal 61 and the base of transistor Q1b.

Capacitors across the base emitter-base terminals of the various transistors prevent turn on of the transistors by induced radio frequency currents. Capacitors across the various zener diodes prevent radio frequency radiation.

What is claimed is:

1. A video display apparatus, comprising:
   a main deflection circuit for generating a main deflection current in a main deflection winding to scan an electron beam on a screen of a cathode ray tube;
   a first amplifier stage for generating an auxiliary deflection current in an auxiliary deflection winding to correct a raster distortion;
   a power supply for developing a supply current of said main deflection circuit and a positive and a negative supply voltage of said first amplifier stage, said power supply developing said positive supply voltage before developing said negative supply voltage;
   a sensor for detecting an occurrence a fault condition in a current path of said power supply current of first amplifier stage; and
   a first power switch responsive to an output of said sensor for disconnecting said power supply voltages of said first amplifier stage, without interrupting said supply current of said main deflection circuit, when said fault condition occurs.

2. The video display apparatus according to claim 1 wherein said first power switch decouples said first amplifer stage from said power supply, when said fault condition occurs.

3. The video display apparatus according to claim 1 wherein said main deflection winding comprises one of a vertical deflection winding and a horizontal deflection winding and wherein said auxiliary winding comprises a convergence winding.

4. The video display apparatus according to claim 1 wherein said main deflection circuit comprises an output stage of said deflection circuit.

5. The video display apparatus according to claim 4 wherein said output stage of said deflection circuit continues operating and said first amplifier stage ceases generating said auxiliary deflection current, when said fault condition occurs.

6. The video display apparatus according to claim 1, further comprising a second amplifier stage for generating a portion of said auxiliary deflection current, a transformer coupled to said power supply for generating a third power supply current of said second amplifier stage and a second power switch responsive to a control signal that is produced in said first amplifier stage for decoupling, in accordance with said control signal, said second amplifier stage from said transformer, when said first fault condition occurs.

* * * * *